Mar. 6, 1923.
T. R. DE ESPARZA.
WATER MOTOR.
FILED SEPT. 7, 1920.
1,447,764.
3 SHEETS—SHEET 2.
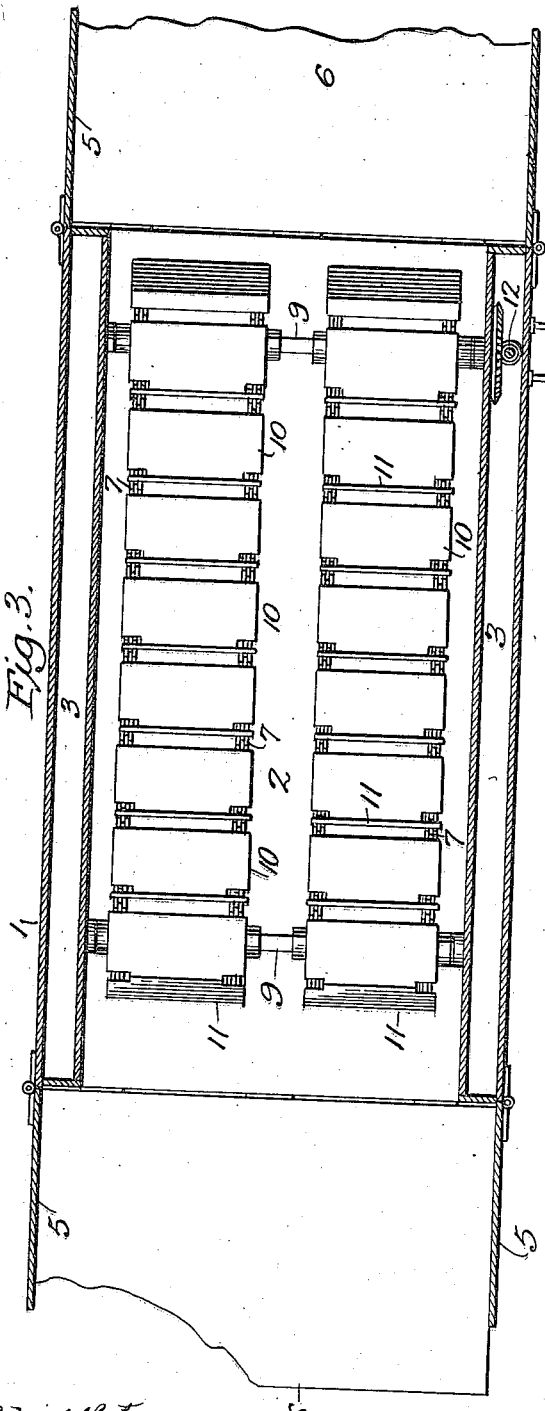
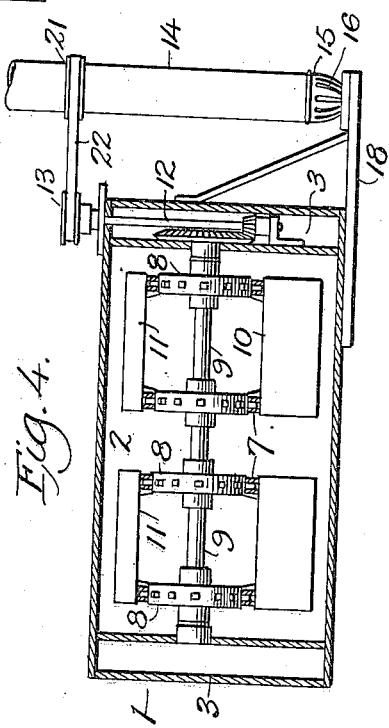
T. R. de Esparza, INVENTOR
BY Victor J. Evans
ATTORNEY
WITNESS: L. B. Middleton

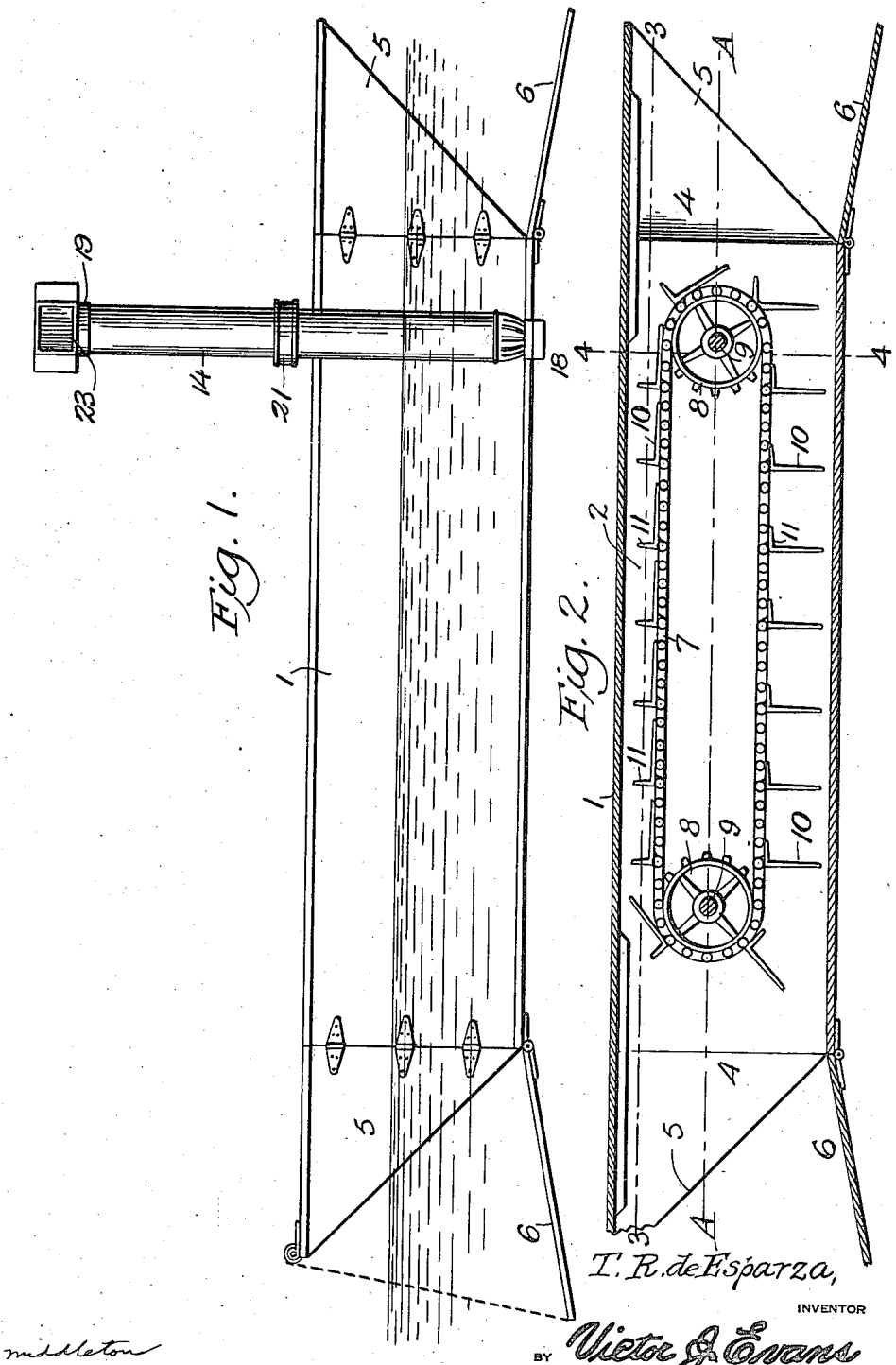

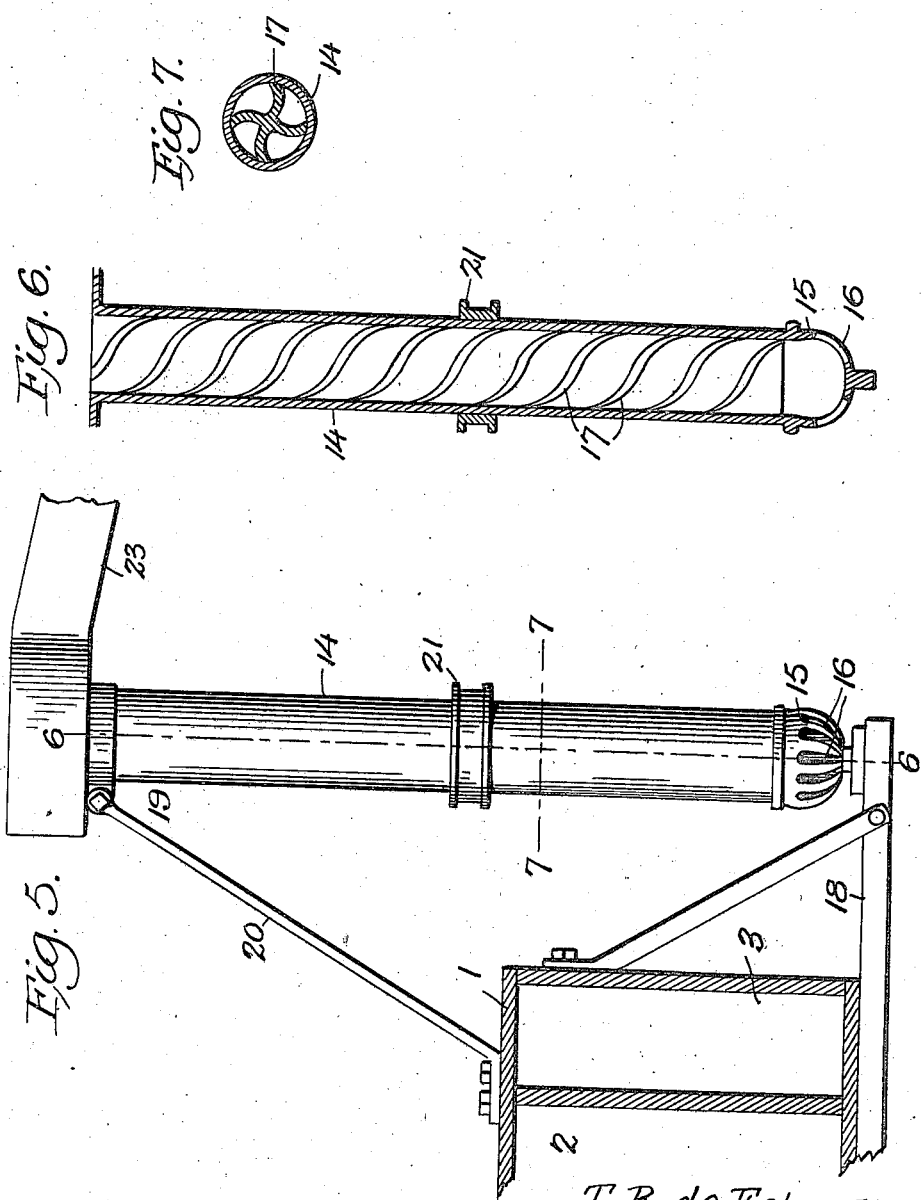

Patented Mar. 6, 1923.

1,447,764

UNITED STATES PATENT OFFICE.

TIMOTEO R. DE ESPARZA, OF CALEXICO, CALIFORNIA.

WATER MOTOR.

Application filed September 7, 1920. Serial No. 408,503.

*To all whom it may concern:*

Be it known that I, TIMOTEO R. DE ESPARZA, a citizen of Mexico, residing at Calexico, in the county of Imperial and State of California, have invented new and useful Improvements in Water Motors, of which the following is a specification.

This invention relates to a boat provided with means whereby power may be developed by a stream of water passing through the same, the principal object of the invention being to provide a boat which may be anchored in a stream and certain gates opened to permit the water to pass through the boat and to cause the water to operate movable parts, the movement of which can be transmitted to other parts.

Another object of the invention is to place a pump device on the boat and to connect the same with the water operated means so as to raise water from the stream into a conduit located at a higher level than the level of the water.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a boat equipped with my invention.

Figure 2 is a longitudinal sectional view through the boat.

Figure 3 is a section on line 3—3 of Figure 2.

Figure 4 is a section on line 4—4 of Figure 2.

Figure 5 is an enlarged view of the pumping means.

Figure 6 is a sectional view on line 6—6 of Figure 5.

Figure 7 is a sectional view on line 7—7 of Figure 5.

In these views 1 indicates the boat which is adapted to be anchored in a river or other stream. The boat is provided with a longitudinally extending chamber 2 which is centrally arranged so as to leave air chambers 3 between its side walls and the sides of the boat so as to impart the necessary buoyancy to the boat. The ends of this chamber are in communication with the chambers 4 at the ends of the boat and each of these end chambers may be thrown open by the side doors 5 and the bottom door 6, the outer edges of the doors 5 being inclined so that the bottom door 6 will abut said edges and will be held in inclined position as shown in Figure 1. These doors form the sloping ends of the boat. The doors are held in closed position by any suitable means and which are carried by the ends of the deck. It will be seen that when these doors are swung to open position the water can pass through the center chamber to operate the water motor placed in said chamber.

This motor is formed of a pair of endless chains 7 which pass over the sprockets 8 which are carried by the shafts 9, the ends of which are carried by the walls of the chamber. Blades 10 are pivoted to the chains and each blade is provided with an arm 11 which projects at right angles therefrom and is adapted to engage the chain when the blade is at the lower run of the chains and thus act to hold the blade in a vertical position so it can be acted upon by the water passing through the chamber. As the blades pass over the rear sprockets the weight thereof will cause them to drop upon the chains so that on the upper run the arms will be in vertical position while the blades are in a horizontal position resting upon the chains. As the parts pass over the front sprockets the blades will assume their vertical positions again under the action of gravity. It will thus be seen that the water will act upon the blades to impart movement to the endless chains and this movement will be imparted to the sprockets and their shafts. One of these shafts extends within one of the air chambers where it is geared to a vertical shaft 12 which passes through the deck of the vessel where it is connected to a pulley 13.

I prefer to make the boat of such buoyancy that the water level within the chamber will be as indicated by the dotted lines A—A so that the upper run of the chains are out of the water.

The pump consists of an upright cylinder 14 which has a closure 15 at its lower end which is provided with openings 16. Within the cylinder are located the curved spirals 17 which are of trough shape in cross section and have their outer edges secured to the inner walls of the cylinder. These spirals extend from end to end of the cylinder and have their lower ends adjacent one of the openings 16 in the closure. The cylinder has its lower end provided with a bearing which is supported on a beam 18 secured to the bottom of the boat and its upper end is supported by a collar 19 which is supported on the boat by the braces 20. A pulley 21 is secured to the cylinder and this pulley is connected by the belt 22 with the pulley on shaft 13 so that the movement of the water motor will be communicated to the cylinder and the rotation of this cylinder will cause the water to travel up the spirals under the action of centrifugal force and flow from the upper end of said cylinder into the trough or conduit 23 which leads the water to any desired point.

If desired I may use the motor as a propelling means for the boat by connecting one of the sprocket shafts with any suitable form of power device to rotate the chains so that the action of the blades on the water in the chamber will propel the boat through the water. It will of course be understood that the doors must be open and moved into a position to offer the least resistance to the passage of the boat through the water.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a boat having a longitudinally extending chamber therein, doors at the ends of the boat, a water motor in said chamber consisting of supporting shafts, sprocket wheels thereon, endless chains passing over said wheels and blades carried by the chains which are pivoted thereto, an arm provided on each blade which projects at right angles therefrom and is adapted to engage the chain, a vertical shaft geared to one of the first mentioned shafts and a pulley connected to said vertical shaft, a pump consisting of an upright cylinder which has a closure at its lower end and the latter having openings therein, grooved spirals located in said cylinder which are trough shape in cross section and have their outer edges secured to the inner walls of the cylinder, and means actuated by the water motor and connected to the cylinder to drive the latter.

2. An apparatus of the class described comprising a boat having a longitudinally extending chamber therein and centrally arranged to provide air chambers between its side walls and the sides of the boat, said boat having chambers at the front and rear thereof which communicate with the first mentioned chamber, doors provided in the front of said boat to form the sloping ends thereof, a water motor in said longitudinally extending chamber consisting of supporting shafts, wheels thereon, endless chains passing over said wheels and blades carried by said chains, an arm provided on each blade which projects at right angles therefrom to engage the chain, a vertical shaft geared to one of the first mentioned shafts which extends within one of the air chambers, a pump consisting of an upright cylinder which has a closure at its lower end and has openings therein, grooved spirals located in said cylinder and extending from end to end, means for connecting the pump to the boat and means for connecting the cylinder with the vertical shaft.

In testimony whereof I affix my signature.

TIMOTEO R. de ESPARZA.